US012257845B2

(12) United States Patent
Furukawa et al.

(10) Patent No.: US 12,257,845 B2
(45) Date of Patent: Mar. 25, 2025

(54) INK REPLACEMENT METHOD IN INK-JET RECORDING APPARATUS

(71) Applicant: KYOCERA Document Solutions Inc., Osaka (JP)

(72) Inventors: Noriaki Furukawa, Osaka (JP); Shunsuke Yamasaki, Osaka (JP); Kaori Kitayama, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 161 days.

(21) Appl. No.: 18/185,308

(22) Filed: Mar. 16, 2023

(65) Prior Publication Data

US 2023/0302808 A1 Sep. 28, 2023

(30) Foreign Application Priority Data

Mar. 24, 2022 (JP) ................................ 2022-049053

(51) Int. Cl.
*B41J 2/175* (2006.01)

(52) U.S. Cl.
CPC ........... *B41J 2/17523* (2013.01); *B41J 2/175* (2013.01); *B41J 2/17596* (2013.01)

(58) Field of Classification Search
CPC ..... B41J 2/17523; B41J 2/175; B41J 2/17596
See application file for complete search history.

(56) References Cited

U.S. PATENT DOCUMENTS

2015/0035913 A1* 2/2015 Tsuji ........................ B41J 2/175
347/85

FOREIGN PATENT DOCUMENTS

JP 2009-269277 A 11/2009

* cited by examiner

*Primary Examiner* — Henok D Legesse
(74) *Attorney, Agent, or Firm* — Stein IP, LLC

(57) ABSTRACT

According to an ink replacement method in an ink-jet recording apparatus that includes a recording head having an ink ejection face in which a plurality of nozzles for ejecting ink onto a recording medium are arranged, a sub-tank that temporarily stores the ink fed from an ink container, and an ink flow passage through which the ink circulates from the sub-tank via the recording head to the sub-tank, gas is inserted between first ink present in the ink flow passage and second ink newly supplied to the recording head via the ink flow passage to form a gas-liquid interface between the first and second ink and gas, and then the first ink is replaced with the second ink.

4 Claims, 4 Drawing Sheets

INK REPLACEMENT METHOD IN INK-JET RECORDING APPARATUS

INCORPORATION BY REFERENCE

This application is based upon and claims the benefit of priority from the corresponding Japanese Patent Application No. 2022-049053 filed on Mar. 24, 2022, the entire contents of which are hereby incorporated by reference.

BACKGROUND

The present disclosure relates to an ink replacement method in an ink-jet recording apparatus.

An ink-jet recording apparatus includes a recording head that ejects ink onto a recording medium such as a sheet to record an image on it. In connection with such ink-jet recording apparatuses, there has been proposed an ink replacement method for efficiently replacing ink present in an ink flow passage with fresh, different ink.

SUMMARY

According to one aspect of the present disclosure, in an ink replacement method in an ink-jet recording apparatus that includes a recording head having an ink ejection face in which a plurality of nozzles for ejecting ink onto a recording medium are arranged, a sub-tank that temporarily stores the ink fed from an ink container, and an ink flow passage through which the ink circulates from the sub-tank via the recording head to the sub-tank, gas is inserted between first ink present in the ink flow passage and second ink newly supplied to the recording head via the ink flow passage to form a gas-liquid interface between the first and second ink, and then the first ink is replaced with the second ink.

DETAILED DESCRIPTION

Embodiments of the present disclosure will be described below with reference to the accompanying drawings. The present disclosure is, however, not limited to what is specifically described below.

Figure 1:
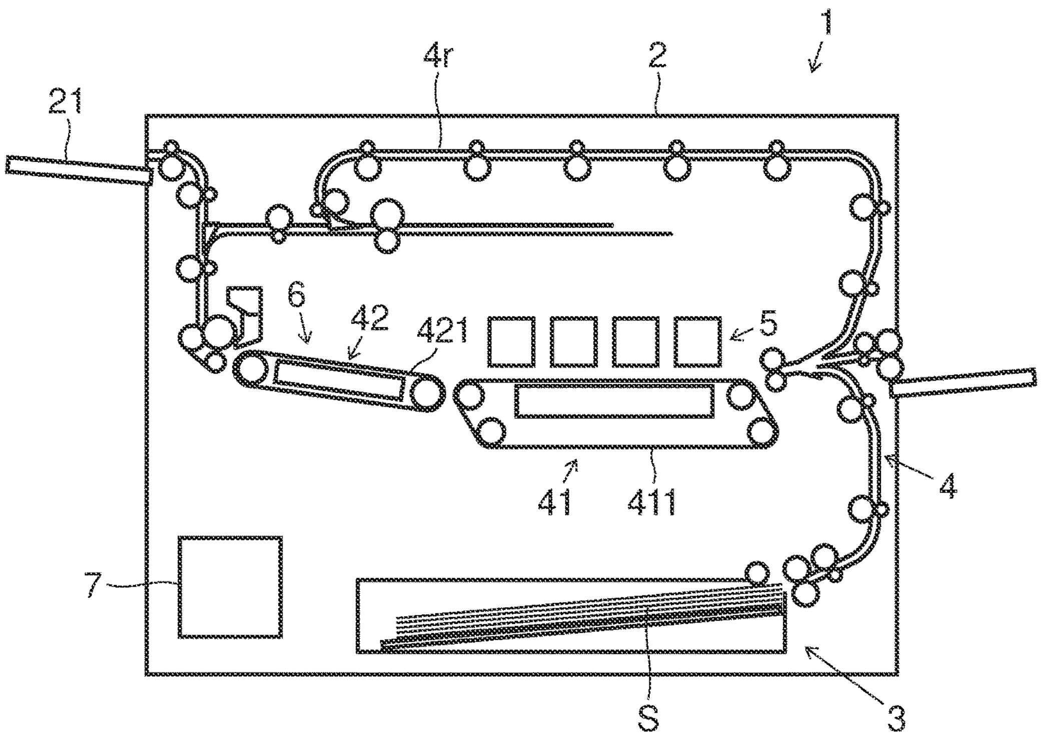
FIG. 1 is a schematic sectional front view of an ink-jet recording apparatus according to one embodiment of the present invention.
Figure 2:
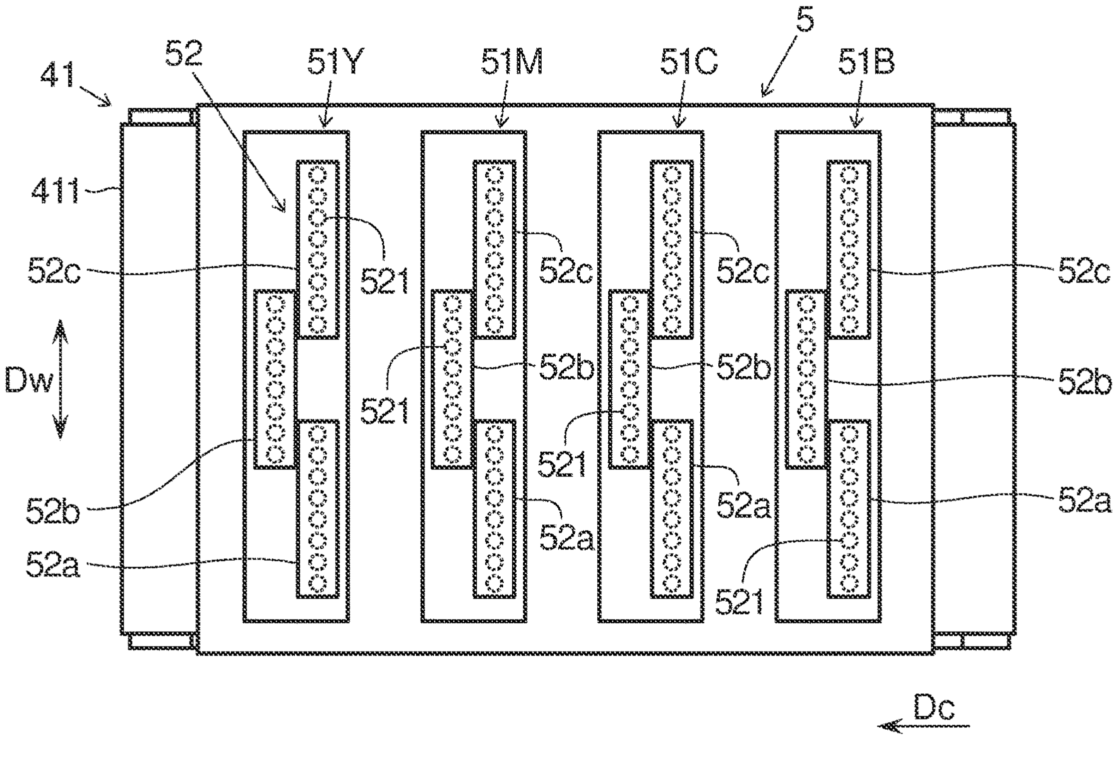
FIG. 2 is a plan view of and around a recording portion in the ink-jet recording apparatus in FIG. 1.
Figure 3:
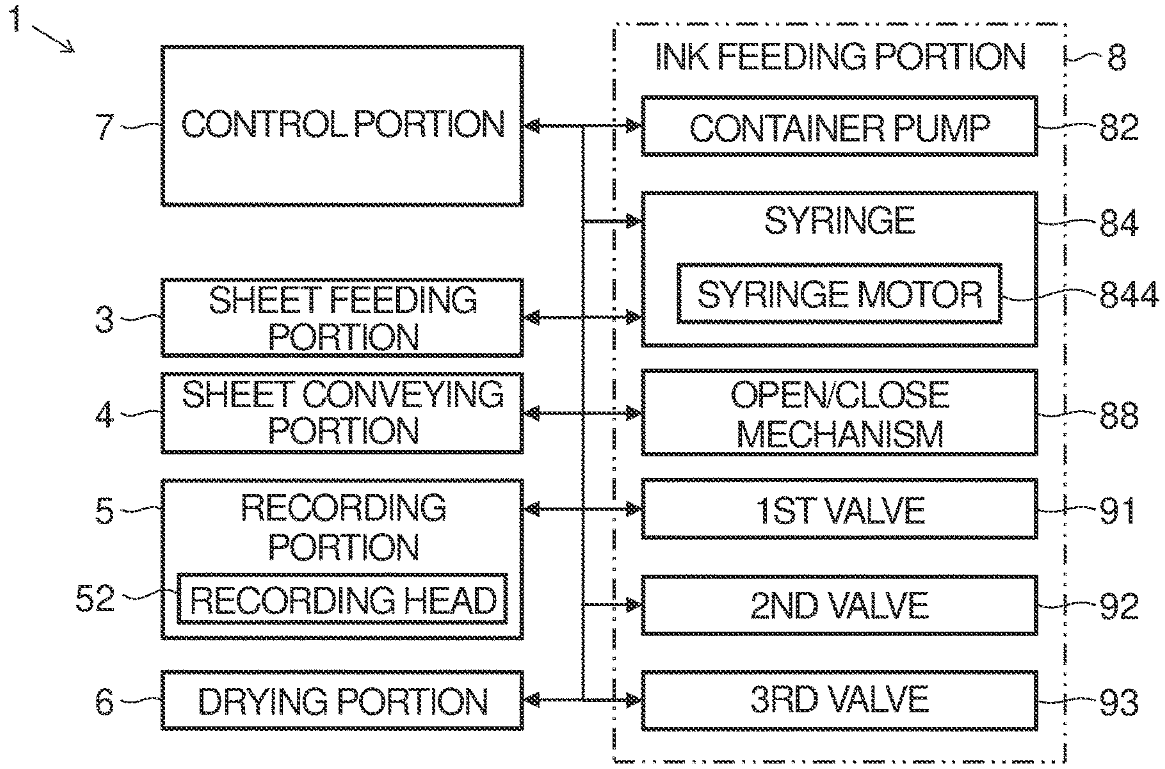
FIG. 3 is a block diagram of the ink-jet recording apparatus in FIG. 1.

FIG. 1 is a schematic sectional front view of an ink-jet recording apparatus 1 according to an embodiment. FIG. 2 is a plan view of and around a recording portion 5 in the ink-jet recording apparatus 1 in FIG. 1. FIG. 3 is a block diagram of the ink-jet recording apparatus 1 in FIG. 1. The ink-jet recording apparatus 1 is, for example, a printer of an ink-jet recording type. The ink-jet recording apparatus 1 includes, as shown in FIGS. 1, 2, and 3, an apparatus main body 2, a sheet feeding portion 3, a sheet conveying portion 4, a recording portion 5, a drying portion 6, and a control portion 7.

The sheet feeding portion 3 is arranged, for example, at a lower part of the apparatus main body 2. The sheet feeding portion 3 stores a plurality of sheets (of a recording medium) S and, during recording, feeds them out one after another separately.

The sheet conveying portion 4 is arranged downstream of the sheet feeding portion 3 in the sheet conveying direction and conveys the sheet S fed out from the sheet feeding portion 3. The sheet conveying portion 4 conveys the sheet S to the recording portion 5 and then to the drying portion 6, and then discharges the sheet S after recording and drying to a sheet discharge portion 21. The sheet conveying portion 4 includes, for example, a reversing conveying portion **4*r*. When duplex recording is performed, the sheet conveying portion 4 switches the conveying direction of the sheet S after recording on its first side and drying to a reversing conveying portion 4*r*, and conveys the sheet S having its conveying direction switched and its obverse and reverse sides reversed to the recording portion 5 and then to the drying portion 6** once again.

The sheet conveying portion 4 includes first and second belt conveying portions 41 and 42. The first belt conveying portion 41 has a first conveying belt 411 formed so as to be endless. The second belt conveying portion 42 has a second conveying belt 421 formed so as to be endless. The first and second first belt conveying portions 41 and 42 convey a sheet S by holding it by suction on the upper outer faces (top faces) of the first and second conveying belts 411 and 421. The first belt conveying portion 41 is arranged under the recording portion 5 and conveys the sheet S. The second belt conveying portion 42 is arranged downstream of the first belt conveying portion 41 in the sheet conveying direction in the drying portion 6 and conveys the sheet S.

The recording portion 5 is arranged downstream of the sheet feeding portion 3 in the sheet conveying direction and is arranged opposite the first belt conveying portion 41. The recording portion 5 faces the sheet S that is conveyed while being held by suction on the top face of the first conveying belt 411 and is arranged above the first conveying belt 411 across a predetermined gap from it. That is, the recording portion 5 faces the sheet S that is conveyed by the sheet conveying portion 4.

As shown in FIG. 2, the recording portion 5 includes head units 51B, 51C, 51M, and 51Y corresponding to four colors, namely black, cyan, magenta, and yellow. The head units 51B, 51C, 51M, and 51Y are arranged side by side along the sheet conveying direction Dc such that their longitudinal direction is parallel to a sheet width direction Dw perpendicular to the sheet conveying direction Dc. The four head units 51B, 51C, 51M, and 51Y have basically similar structures. Thus, in the following description, the suffixes "B", "C", "M", and "Y" distinguishing different colors are often omitted, unless distinction is needed.

The head units 51 for the different colors each include line recording heads 52 of an ink-jet type. In each of the head units 51 for the different colors, a plurality of recording heads 52 (for example, three of them (**52*a*, 52*b*, and 52*c***)) are arranged in a staggered formation along the sheet width direction Dw.

The recording head 52 has a plurality of ink ejecting nozzles 521 in a bottom part of it. The plurality of ink ejecting nozzles 521 are arrayed along the sheet width direction Dw so that ink can be ejected over the entire recording region of the on the sheet S. That is, the recording head 52 includes an ink ejection face in which a plurality of ink ejecting nozzles 521 for ejecting ink on the sheet S are arranged. The recording portion 5 ejects ink sequentially from the recording heads 52 in the head units 51B, 51C, 51M, and 51Y of four colors toward the sheet S conveyed by the first conveying belt 411 so as to record on it a full-color image or a monochrome image.

The drying portion 6 is arranged downstream of the recording portion 5 in the sheet conveying direction and includes the second belt conveying portion 42. While the sheet S with an ink image recorded on it in the recording portion 5 is being conveyed while being held by suction on the second conveying belt 421 in the drying portion 6, the ink is dried.

The control portion 7 includes a CPU, a storage portion, and other electronic circuits and components (none of which illustrated). The CPU, based on control programs and data stored in the storage portion, controls the operation of different components provided in the ink-jet recording apparatus 1 to perform processing related to the functions of the ink-jet recording apparatus 1. The sheet feeding portion 3, the sheet conveying portion 4, the recording portion 5, and the drying portion 6 individually receive commands from the control portion 7 and coordinate to perform recording on the sheet S. The storage portion is composed of a combination of, for example, a non-volatile storage device such as a program ROM (read-only memory) and a data ROM and a volatile storage device such as a RAM (random-access memory).

Figure 4:
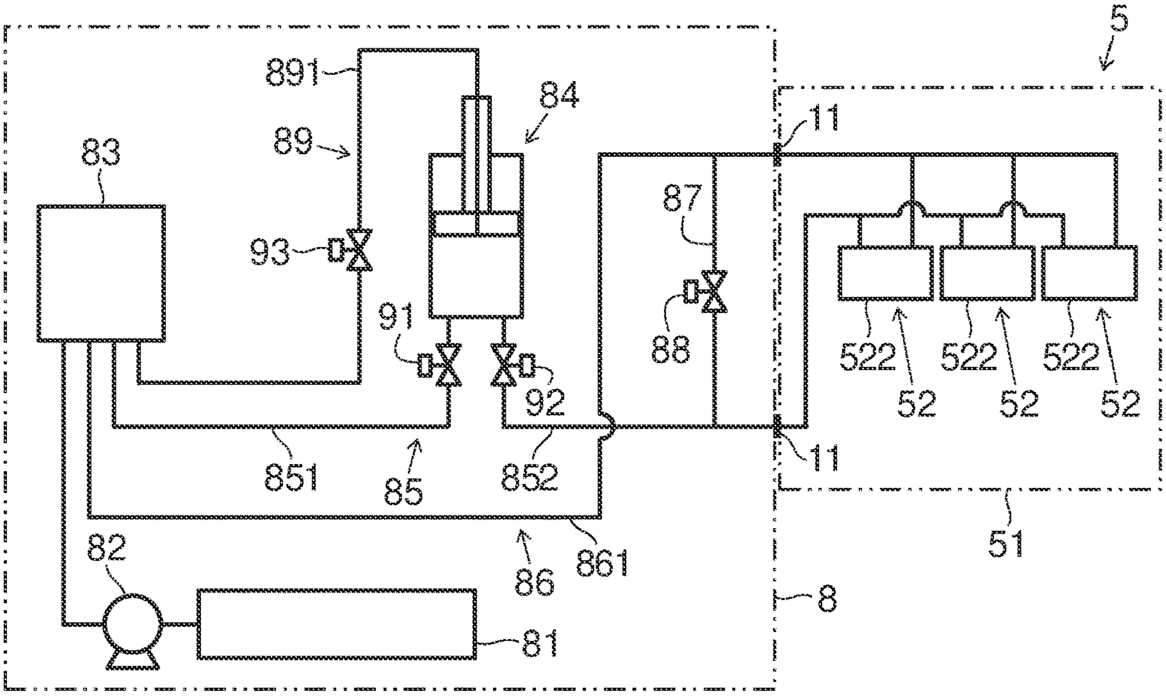
FIG. 4 is a an illustrative diagram of and around an ink feeding portion in the ink-jet recording apparatus in FIG. 1.
Figure 5:
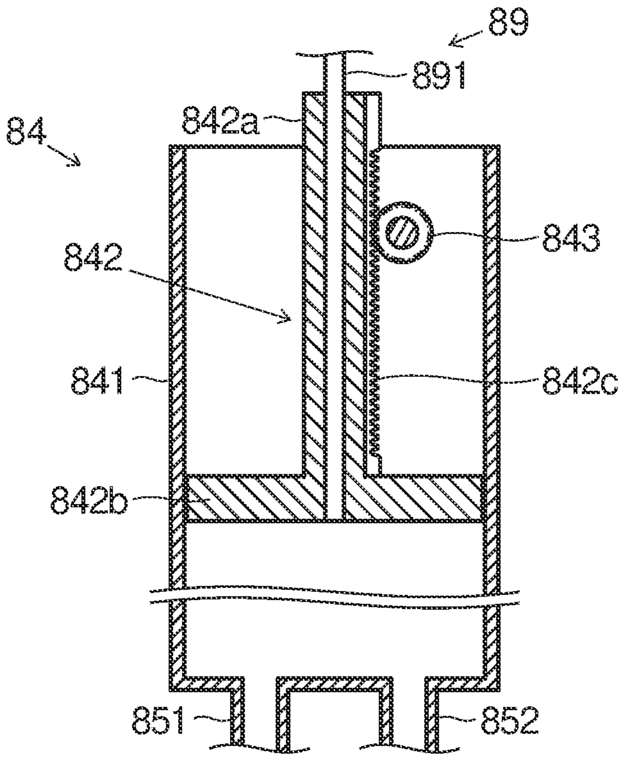
FIG. 5 is a sectional view of a syringe in the ink feeding portion in FIG. 4.
Figure 6:
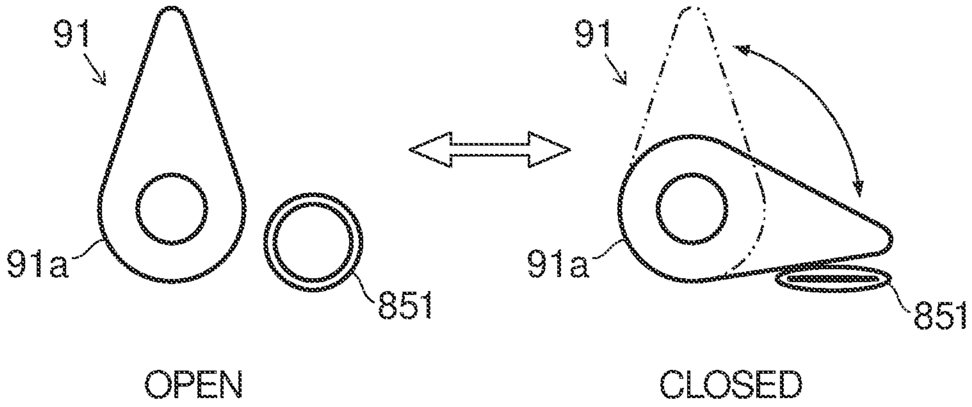
FIG. 6 is a diagram illustrating a valve in the ink feeding portion in FIG. 4.

Next, the construction of an ink feeding portion 8 in the ink-jet recording apparatus 1 will be described with reference to FIGS. 4 to 6. FIG. 4 is a an illustrative diagram of and around the ink feeding portion 8 in the ink-jet recording apparatus 1 in FIG. 3. FIG. 5 is a sectional view of a syringe 84 in the ink feeding portion 8. FIG. 6 is a diagram illustrating a valve in the ink feeding portion 8 in FIG. 4.

The ink-jet recording apparatus 1 includes the ink feeding portion 8. One ink feeding portion 8 is provided for each of the head units 51 for four colors. In the following description, suffixes distinguishing different colors are omitted. The ink feeding portion 8 and the head unit 51 are coupled together with a removable coupling 11. The coupling 11 incorporates a valve member (not shown) that in a connected state opens the ink flow passage and in a disconnected state closes the ink flow passage.

The ink feeding portion 8 includes an ink container 81, a container pump 82, a sub-tank 83, a syringe 84, a first flow passage 85, a second flow passage 86, a communication flow passage 87, and an open/close mechanism 88. The ink feeding portion 8 further includes a third flow passage 89, a first valve 91, a second valve 92, and a third valve 93.

The ink container 81 is removably provided in the apparatus main body 2. The ink container 81 stores ink to be supplied to the recording head 52.

The container pump 82 is arranged downstream of the ink container 81 in an ink flow direction. The container pump 82 sucks the ink in the ink container 81 and ejects it toward the sub-tank 83. The operation of the container pump 82 is controlled by the control portion 7.

The sub-tank 83 is arranged downstream of the container pump 82 in the ink flow direction. The sub-tank 83 temporarily stores ink fed from the ink container 81. The sub-tank 83 is provided with an ink amount sensor (not shown). The ink amount sensor includes a sensor of, for example, an optical type, a capacitance type, an electrode type, a differential pressure type, or a float type and detects the amount of ink in the sub-tank 83.

The control portion 7 receives a sense signal from the ink amount sensor in the sub-tank 83. When the amount of ink in the sub-tank 83 sensed by the ink amount sensor becomes less than a predetermined value, the control portion 7 controls the container pump 82 to supply ink from the ink container 81 to the sub-tank 83. The amount of ink supplied from the ink container 81 to the sub-tank 83 is controlled, for example, based on the driven time of the container pump 82. If, even when the driven time of the container pump 82 exceeds a given time, the amount of ink in the sub-tank 83 sensed by the ink amount sensor does not become more than the predetermined value, the control portion 7 judges that the amount of ink in the ink container 81 is zero.

The sub-tank 83 and the recording head 52 are arranged so that the liquid level in the sub-tank 83 and the ink ejection face 522 are in such a positional relationship in height as to form meniscus faces in the nozzle holes for ejecting ink in the ink ejecting nozzle 521.

The syringe 84 is arranged downstream of the sub-tank 83 in the ink flow direction, upstream of the recording head 52 in the ink flow direction. Ink flows from the sub-tank 83 into the syringe 84 and flows out of it toward the recording head 52. As shown in FIG. 5, the syringe 84 includes a barrel 841 and a plunger 842.

The barrel 841 is in a cylindrical shape with its axis extending in the up-down direction. The barrel 841 is open at its top end. The barrel 841 is closed at its bottom end, to which are connected a first pipe 851 that extends from the sub-tank 83 and a second pipe 852 that extends toward the recording head 52. The first and the second pipes 851 and 852 communicate with the inside of the barrel 841.

The plunger 842 is inserted in the barrel 841 through the opening at its top end. The plunger 842 has a shaft portion 842*a* and a gasket portion 842*b*. The shaft portion 842*a* is formed so that its axis extends in the up-down direction. The gasket portion 842*b* is arranged at the lower end of the shaft portion 842*a*. The gasket portion 842*b* is in a cylindrical shape extending along the inner circumferential face of the barrel 841, and its outer circumferential face makes close contact with the inner circumferential face of the barrel 841. This prevents ink in the barrel 841 from leaking to above the gasket portion 842*b*.

A fourth pipe 891 of the third flow passage 89 is inserted in a central part of the plunger 842 in its radial direction. The fourth pipe 891 communicates with the inside of the barrel 841. The air stagnant in the barrel 841, that is, above the ink in the syringe 84 but blow the gasket portion 842*b* is discharged above via the fourth pipe 891.

The third flow passage 89 extends from the syringe 84 up to the sub-tank 83. The third flow passage 89 is an air flow passage for discharging the air in the syringe 84 to the sub-tank 83. In other words, the fourth pipe 891 of the third flow passage 89 is a pipe for discharging the air in the syringe 84 through a path different from the ink flow passage.

The third valve 93 is arranged on the fourth pipe 891 of the third flow passage 89. The third valve 93 opens and closes the third flow passage 89. The third valve 93 is, for example, a solenoid valve and is controlled to open and close by the control portion 7. The control portion 7 opens the third valve 93 when discharging the air in the syringe 84.

On the side face of the shaft portion 842*a*, a rack 842*c* is formed. The rack 842*c* has a plurality of teeth arrayed in the up-down direction and is meshed with a syringe driving gear

843. The syringe driving gear 843 is connected to a syringe motor 844 (see FIG. 3) and receives a driving force from the syringe motor 844 to rotate in forward and reverse directions. As the syringe driving gear 843 rotates in forward and reverse directions, the plunger 842 can reciprocate in the up-down direction. The operation of the syringe motor 844 is controlled by the control portion 7.

During image recording on a sheet S, a recording pressure is applied to the ink by the action of the water head pressure. On the other hand, during, for example, maintenance, the control portion 7 can apply to the ink a maintenance pressure higher than the recording pressure by moving the plunger 842 downward in a high speed with the syringe motor 844 to push the ink out of the syringe 84. That is, the syringe 84 can apply to the ink a maintenance pressure higher than the recording pressure applied during recording to the sheet S.

The first flow passage 85, the second flow passage 86, and the communication flow passage 87 constitute an ink flow passage through which the ink circulates from the sub-tank 83 via the recording head 52 to the sub-tank 83.

The first flow passage 85 is an ink flow passage through which the ink circulates from the sub-tank 83 via the syringe 84 to the recording head 52. The first flow passage 85 includes a first pipe 851 that extends from the sub-tank 83 to the syringe 84 and a second pipe 852 that extends from the syringe 84 to the recording head 52.

The first valve 91 is arranged on the first pipe 851 of the first flow passage 85, upstream of the syringe 84 in the ink flow direction. The first pipe 851 is a tube formed of, for example, rubber and can be deformed so as to bend or sag. As shown in FIG. 6, the first valve 91 includes an open/close cam 91*a* and an open/close motor (not shown).

The open/close cam 91*a* is adjacent to the first pipe 851. The open/close cam 91*a* is formed in a wedge shape as seen from the axial direction of the first pipe 851. The open/close cam 91*a* is supported rotatably about a rotation axis parallel to the axis of the first pipe 851. The open/close cam 91*a* swings as it is rotated by the open/close motor such that a tip-end part of its wedge shape moves into contact with and away from the first pipe 851.

To open the first valve 91, the control portion 7 controls the open/close motor to rotate the open/close cam 91*a* to such an angle as not to make contact with or deform the first pipe 851. This permits the ink to flow through the first pipe 851 across the first valve 91. To close the first valve 91, the control portion 7 controls the open/close motor to rotate the open/close cam 91*a* to such an angle as to make contact with and press the first pipe 851. This inhibits the ink from flowing through the first pipe 851 across the first valve 91. The first valve 91 opens and closes the first flow passage 85 between the sub-tank 83 and the syringe 84.

The second valve 92 is arranged on the second pipe 852 of the first flow passage 85. The configuration and the operation of the second valve 92 is similar to those of the first valve 91, and thus no overlapping description will be repeated. The second valve 92 is controlled to open and close by the control portion 7. The second valve 92 opens and closes the first flow passage 85 between the syringe 84 and the recording head 52.

The second flow passage 86 is an ink flow passage through which the ink circulates from the recording head 52 to the sub-tank 83. The second flow passage 86 includes a third pipe 861 that extends from the recording head 52 to the sub-tank 83.

The communication flow passage 87 allows an upstream part of the recording head 52 in the ink flow direction in the first flow passage 85 and a downstream part of the recording head 52 in the ink flow direction in the second flow passage 86 to communicate with each other. More specifically, the communication flow passage 87 is, near the coupling 11 in the ink feeding portion 8, connected between the second pipe 852 of the first flow passage 85 and the third pipe 861 of the second flow passage 86.

The open/close mechanism 88 is arranged on the communication flow passage 87. The open/close mechanism 88 is, for example, a solenoid valve and is controlled to open and close by the control portion 7. The open/close mechanism 88 opens and closes the communication flow passage 87.

Figure 7:
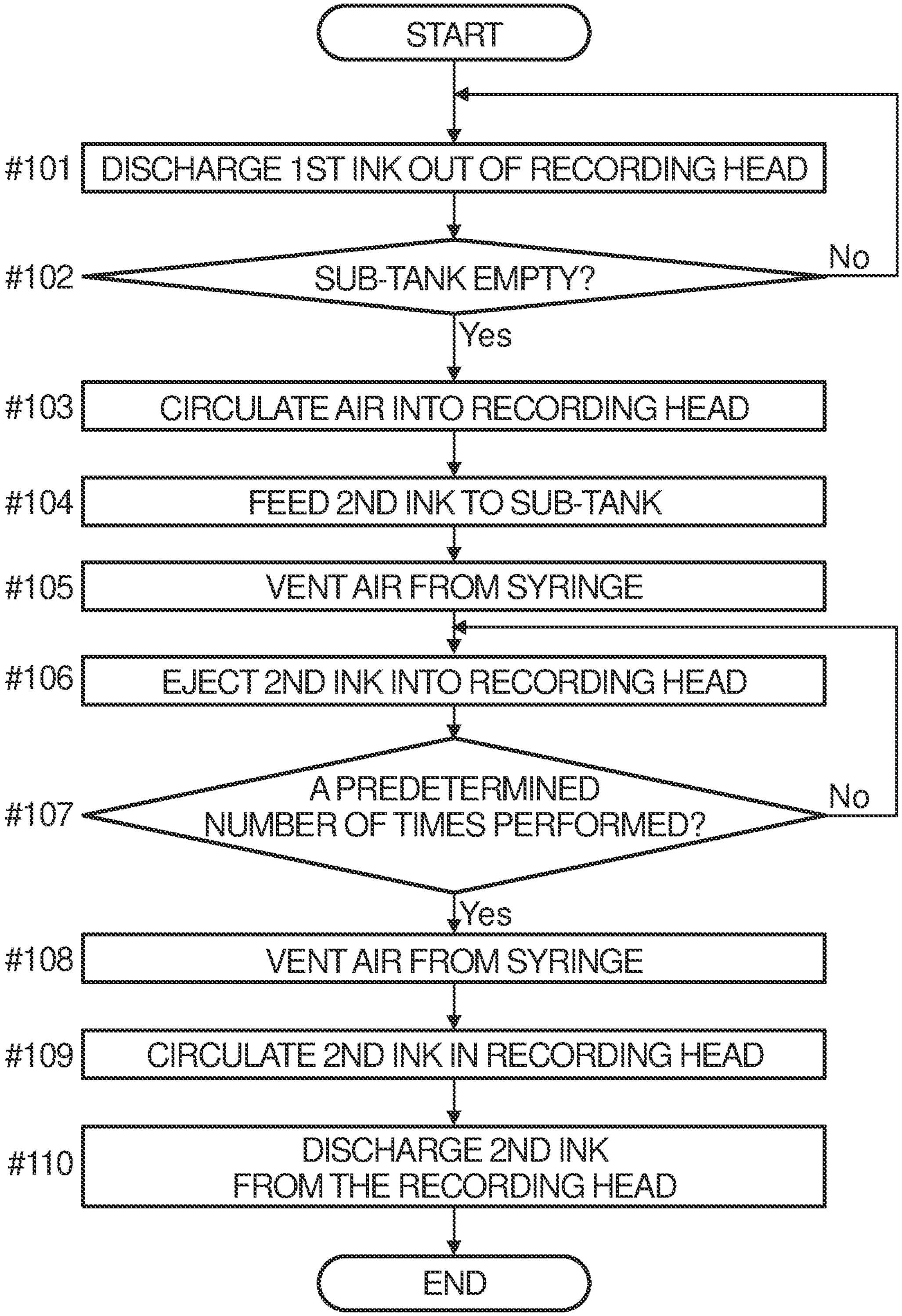
FIG. 7 is a flow chart showing an example of a procedure for replacement with different ink in the ink-jet recording apparatus in FIG. 1.

Next, an example of replacement with different ink will be described along with the flow chart. FIG. 7 is a flow chart showing an example of a procedure for replacement with different ink in the ink-jet recording apparatus 1 in FIG. 1. In the following description, the ink that is already present in the ink flow passage is referred to as "first ink", and the ink that is newly supplied to the recording head 52 to replace the first ink is referred to as "second ink".

When the procedure for replacement with different ink is started in the ink-jet recording apparatus 1 (START in FIG. 7), the control portion 7 discharges the first ink present in the ink flow passage out of the recording head 52 (step #101). Here, the control portion 7 controls the syringe motor 844 to discharge, by pushing operation by the syringe 84, the first ink out of the recording head 52.

Then, the control portion 7 performs an ink discharging process (step #102) in which the first ink is discharged out of the recording head 52 until the sub-tank 83 becomes empty. Here, the amount of ink in the sub-tank 83 is sensed, for example, by the ink amount sensor in the sub-tank 83.

When the sub-tank 83 is empty (Yes in step #102), the control portion 7 performs a gas filling process in which air (gas) is circulated from the empty sub-tank 83 through the ink flow passage into the recording head 52 (step #103).

Here, the control portion 7 controls the open/close motor to open the first valve 91 and close the second valve 92 and then controls the syringe motor 844 to suck, by sucking operation by the syringe 84, air into the syringe 84 from the sub-tank 83. Next, the control portion 7 controls the open/close motor to close the first valve 91 and open the second valve 92 and then controls the syringe motor 844 to push, by the pushing operation by the syringe 84, air from the sub-tank 83 toward the recording head 52. The amount of air pushed out by the pushing operation by the syringe 84 can be freely set to any amount up to the maximum capacity of the syringe 84.

During the ink discharging process and the gas filling process, the open/close mechanism 88 is open.

Next, the control portion 7 feeds the second ink from the ink container 81 to the sub-tank 83 (step #104). Here, the control portion 7 drives the container pump 82.

Next, the control portion 7 performs operation to vent air from the syringe 84 (step #105). Here, the control portion 7 controls the open/close motor to close the first and second valves 91 and 92 and open the third valve 93 and then controls the syringe motor 844 to discharge, by the pushing operation by the syringe 84, the air in the syringe 84 via the fourth pipe 891 of the third flow passage 89.

Next, the control portion 7 performs an ink injecting process in which the second ink is ejected from the sub-tank 83 through the ink flow passage into the recording head 52 (step #106). Here, the control portion 7 controls the syringe motor 844 to inject, by the pushing operation by the syringe 84, the second ink into the recording head 52. Then, the control portion 7 performs this process a predetermined number of times (step #107).

During the ink ejecting process, the open/close mechanism 88 is closed. While the ink injecting process is performed, operation to push air toward the recording head 52 can be performed.

Then, the control portion 7 performs operation to vent air from the syringe 84 (step #108), operation to circulate the second ink in the recording head 52 (step #109), and operation to discharge (purge) the second ink from the recording head 52 (step #110). Here, the control portion 7 controls, as necessary, the open/close operation of the first and second valves 91 and 92 and the sucking and pushing operation by the syringe 84. The air in the recording head 52 is thereby discharged out of it.

After the operation to circulate the second air in the recording head 52 and the operation to discharge the second ink from the recording head 52, it is preferable to perform wiping of the ink ejection face 522.

As described above, according to the ink replacement method in the ink-jet recording apparatus 1, gas (air) is inserted between the first ink present in the ink flow passage and the second ink that is newly supplied to the recording head 52 via the ink flow passage to form a gas-liquid interface between the first and second ink and gas, and then the first ink is replaced with the second ink. With this configuration, during replacement of the first ink with the second ink, it is possible to efficiently discharge, with the gas-liquid interface, the first ink that is already present in the ink flow passage. Thus, it is possible to reduce the amount of consumed ink and the required time during replacement with different ink in the ink-jet recording apparatus 1.

It is preferable that the first and second ink have a dynamic surface tension of 50 [mN/m] or less at a surface life of 10 [ms]. By keeping the surface tension low, it is possible to easily fill the ink up to the recording head 52 and to prevent air bubbles from forming around the ink ejecting nozzle 521. This helps prevent curved flight of ejected ink and ink ejection failure.

It is preferable that the ink flow passage have a cross-sectional area perpendicular to the ink flow direction of 20 [$mm^2$] or less. In this way, it is possible to easily form a gas-liquid interface in the ink flow passage. For example, in the case of a pipe with a circular cross-section, its diameter is preferably 5 mm or less. Or, in the case of a pipe with a rectangular cross-section, its longer side preferably has a length of 5 mm or less.

The ink replacement method described above in the ink-jet recording apparatus 1 includes the ink discharging process, the gas filling process, and the ink injecting process. With this configuration, it is possible to easily insert air (gas) between the first and second ink. Thus, it is possible to efficiently form a gas-liquid interface between the first and second ink and air.

In the ink replacement method described above, using the syringe 84, the first and second ink and air are sucked from the sub-tank 83 and are pushed out toward the recording head 52. With this configuration, during image recording on a sheet S, in the ink-jet recording apparatus 1 that is not configured to circulate ink using a pump or the like, it is possible to move the first and second ink and air in the ink flow passage.

The fourth pipe 891 of the third flow passage 89 discharges the air in the syringe 84 through a path different from the ink flow passage. With this configuration, without affecting the ink in the ink flow passage, it is possible to discharge the air in the syringe 84 and to bring the syringe 84 into a state where it can suck ink. In this way, it is possible to efficiently achieve ink replacement.

The open/close mechanism 88 is open during the ink discharging process and the gas filling process and is closed during the ink injecting process. With this configuration, it is possible to efficiently perform with respect to the ink flow passage and the recording head 52 discharge of the first ink, filling with air, and ejection of the second ink. Thus, it is possible to improve efficiency in ink replacement, and this helps more effectively reduce the amount of consumed ink and the required time during ink replacement.

The description given above of embodiments of the present disclosure is in no way meant to limit the scope of the present disclosure; the present disclosure can be implemented with any modifications made without departing from the sense of the present disclosure.

For example, while the above embodiments deal with the ink replacement method in which the first ink present in the ink flow passage is replaced with the second ink that is newly supplied to the recording head, liquid such as cleaning solution can be used instead of ink. When cleaning solution is injected between the first and second ink, an ink replacement method similar to the one according to the above embodiment is performed both during replacement of the first ink with the cleaning solution and during replacement of the cleaning solution with the second ink.

What is claimed is:

1. An ink replacement method in an ink-jet recording apparatus including a recording head having an ink ejection face in which a plurality of nozzles for ejecting ink onto a recording medium are arranged, a sub-tank that temporarily stores the ink fed from an ink container, and an ink flow passage through which the ink circulates from the sub-tank via the recording head to the sub-tank, wherein gas is inserted between a first ink present in the ink flow passage and a second ink newly supplied to the recording head via the ink flow passage to form a gas-liquid interface between the first and second ink and the gas, and then the first ink is replaced with the second ink, the method comprising;

an ink discharging process in which the first ink in the ink flow passage is discharged out of the recording head until the sub-tank becomes empty;

a gas filling process in which the gas is circulated from the empty sub-tank through the ink flow passage into the recording head; and an ink injecting process in which the second ink is ejected from the sub-tank through the ink flow passage into the recording head.

2. The ink replacement method in the ink-jet recording apparatus according to claim 1, wherein the ink-jet recording apparatus includes a syringe that is arranged downstream of the sub-tank in the ink flow direction in the ink flow passage but upstream of the recording head, and the syringe sucks from the sub-tank the first ink, the second ink, or the gas and pushes the first ink, the second ink, or the gas toward the recording head.

3. The ink replacement method in the ink-jet recording apparatus according to claim 2, wherein the ink-jet recording apparatus includes a pipe for discharging the gas in the syringe through a path different from the ink flow passage.

4. The ink replacement method in the ink-jet recording apparatus according to claim 1, wherein the ink-jet recording apparatus includes a communication flow passage that allows upstream and downstream parts of the recording head in the ink flow direction in the ink flow passage to communicate with each other and an open/close mechanism that opens and closes the communication flow passage, and the open/close mechanism is open during the ink discharging process and the gas filling process and is closed during the ink injecting process.

* * * * *